No. 748,104. PATENTED DEC. 29, 1903.
J. A. ROSBACK.
COMBINED CREAM SEPARATOR AND CHURN.
APPLICATION FILED MAR. 26, 1900.
NO MODEL.
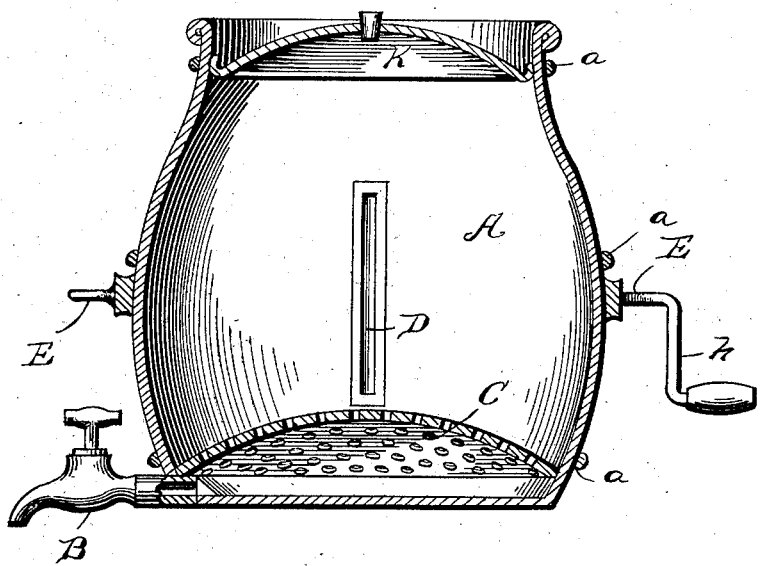
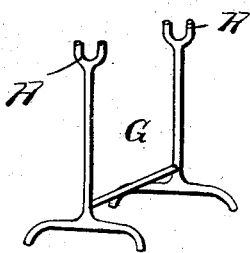
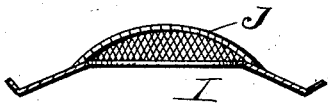
Inventor
Joshua A. Rosback
Witnesses
By
Attorneys

UNITED STATES PATENT OFFICE.

JOSHUA A. ROSBACK, OF HERMON, NEW YORK.

COMBINED CREAM-SEPARATOR AND CHURN.

SPECIFICATION forming part of Letters Patent No. 748,104, dated December 29, 1903.

Application filed March 26, 1900. Serial No. 10,227. (No model.)

*To all whom it may concern:*

Be it known that I, JOSHUA A. ROSBACK, a citizen of the United States, residing at Hermon, in the county of St. Lawrence and State of New York, have invented certain new and useful Improvements in a Combined Cream-Separator and Churn; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in cream-separators and is designed, primarily, as an improvement upon the separator for which I obtained a patent May 2, 1899, No. 624,100, having for its object among others to adapt the machine for both a churn and a cream-separator.

Other objects and advantages of the invention will hereinafter appear, and the novel features thereof will be specifically pointed out in the appended claims.

The invention is clearly illustrated in the accompanying drawings, which, with the letters of reference marked thereon, form a part of this specification, and in which—

Figure 1 is a substantially central vertical section with portions in elevation. Fig. 2 is a sectional view of one of the covers. Fig. 3 is a perspective view, on a smaller scale, of the frame or support for the body of the device.

The body vessel A of my improved churn and cream-separator has pivot-trunnions E, adapted to rest in the bearings H of a stand G, and has a crank $h$, whereby it may be revolved. Said vessel has one end closed and provided with a faucet B, by means of which its liquid contents may be drawn off. The opposite end of the vessel is open, and a cover K is adapted to be placed therein to form a closure therefor. Said closure is held in place by friction and is concave on its under side. The vessel is of approximately spherical form, its sides being of interior curvilinear form from end to end, and the cover conforms to the curvilinear inner shape of the vessel to adapt the same to be readily revolved by the application of but slight force when filled with cream, thus enabling the vessel to be readily rotated manually and at a comparatively high speed. The vessel is provided with hoops $a$ and has a glass-covered aperture D in one side, through which it may be seen when the cream is separated from the milk when the device is used as a cream-separator and which also enables the contents of the vessel to be observed when it is used as a churn, so that it may be seen when the butter is formed. A concavo-convex perforated plate or diaphragm C is placed and suitably secured in the closed end of the vessel, with its convex side innermost and opposed to the concave side of the closure K, so that the said diaphragm is disposed substantially at right angles with respect to the curvilinear inner side of the vessel. This diaphragm, owing to its shape and its disposition with respect to the sides of the vessel, once during each rotation thereof dashes into and through the cream and then emerges therefrom, thus forming an efficient dasher, which facilitates the forming of the butter and causes the butter produced to be of high grade. When the churning operation is completed, the rotation of the vessel is suspended and the same is held with its closed end lowermost. The faucet being then opened, all the liquid contents are discharged therefrom, drained from the butter, and the latter left upon the perforated diaphragm, and may be readily removed therewith, the same having operated as a strainer.

When the device is to be used as a cream-separator, the diaphragm C may be removed and a closure I, having a foraminous ventilator J, substituted for the closure K, the latter being used in churning.

What I claim as new is—

1. A combined cream-separator and churn comprising a body vessel having a pivot-axis and means whereby it may be revolved, said vessel being provided at one end with means for drawing off its contents at will, being open at the opposite end, and being of curvilinear interior form, from end to end, a closure for the open end of the vessel, concave on its inner side, and a perforated diaphragm in the vessel, near the closed end thereof, and of concavo-convex form, with its convex side opposed to the concave side of the closure and disposed at substantially right angles with reference to the sides of the vessel, said perforated diaphragm forming a dasher when the vessel is revolved, and a strainer when the vessel is at rest with its closed end lowermost, substantially as described.

2. A churn comprising a vessel having trunnions upon which it may be revolved, said vessel being provided at its lower end with means for drawing off its contents at will, and being open at its opposite end, a closure for the open end of the vessel and an inverted perforated concavo-convex diaphragm situated in the bottom of the vessel, substantially as described.

In testimony whereof I affix my signature in presence of two witnesses.

JOSHUA A. ROSBACK.

Witnesses:
G. S. CONGER,
A. W. ORVIS.